(12) United States Patent
Acharya et al.

(10) Patent No.: US 9,165,080 B2
(45) Date of Patent: Oct. 20, 2015

(54) SYSTEMS AND METHODS FOR CREATING SCALABLE PRESENCE SUBSCRIPTIONS IN FEDERATED PRESENCE ENVIRONMENTS

(75) Inventors: Arup Acharya, Nanuet, NY (US); Nilanjan Banerjee, West Bengal (IN); Dipanjan Chakraborty, Kolkata (IN); Koustuv Dasgupta, New Delhi (IN); Shachi Sharma, Delhi (IN); Xiping Wang, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 12/976,488

(22) Filed: Dec. 22, 2010

(65) Prior Publication Data

US 2012/0166420 A1   Jun. 28, 2012

(51) Int. Cl.
  *G06F 7/00* (2006.01)
  *G06F 17/30* (2006.01)
(52) U.S. Cl.
  CPC .... *G06F 17/30873* (2013.01); *G06F 17/30864* (2013.01)
(58) Field of Classification Search
  USPC ............................ 707/736, 999.102, 787, 737
  See application file for complete search history.

(56) References Cited

U.S. PATENT DOCUMENTS

| | | | |
|---|---|---|---|
| 6,493,725 B1* | 12/2002 | Iwai et al. ............................. | 1/1 |
| 2002/0091975 A1* | 7/2002 | Redlich et al. ................ | 714/699 |
| 2002/0156879 A1* | 10/2002 | Delany et al. ................ | 709/223 |
| 2004/0027601 A1* | 2/2004 | Ito et al. ........................ | 358/1.13 |
| 2005/0278294 A1* | 12/2005 | Beartusk et al. .................. | 707/1 |
| 2006/0020607 A1* | 1/2006 | Patterson ....................... | 707/100 |
| 2006/0031234 A1* | 2/2006 | Beartusk et al. .............. | 707/100 |
| 2006/0210162 A1* | 9/2006 | Sato ............................... | 382/176 |
| 2006/0242237 A1 | 10/2006 | Manion et al. | |
| 2007/0250517 A1* | 10/2007 | Bestgen et al. ............... | 707/100 |
| 2007/0291859 A1 | 12/2007 | Maes | |
| 2008/0091697 A1* | 4/2008 | Cui et al. ....................... | 707/101 |
| 2009/0299767 A1* | 12/2009 | Michon et al. ..................... | 705/3 |
| 2010/0257100 A1* | 10/2010 | Silverbrook et al. ........... | 705/50 |
| 2011/0257972 A1* | 10/2011 | Agevik .......................... | 704/235 |

OTHER PUBLICATIONS

Acharya et al., A Scalable Middleware for Presence Virtualization and Federation, published as an IBM Research Report, Apr. 27, 2009.
Acharya et al, "Programmable Presence Virtualization for Next-Generation Context-Based Applications", Source: IEEE International Conference on Pervasive Computing and Communications, Mar. 2009 Publisher: IEEE.

\* cited by examiner

*Primary Examiner* — Khanh Pham
*Assistant Examiner* — Eliyah S Harper
(74) *Attorney, Agent, or Firm* — Ference & Associates LLC

(57) ABSTRACT

Systems and associated methods for providing scalable presence subscriptions in federated presence environments are described. Embodiments provide for intelligent addition of subscriptions to a presence system. Embodiments identify if a virtualized presentity (corresponding to a new query) can be composed from existing virtualized presentities, and if so, corresponding query processing cells (QPCs) (servicing existing queries) are reused to retrieve the presence information (partially or fully) for the new incoming query. Embodiments organize the existing QPCs into a hierarchy such that a QPC/virtual presentity at a higher layer fetches presence information of all or some presentities from QPCs/virtual presentities at lower layer(s) to service the new query.

20 Claims, 10 Drawing Sheets

SYSTEMS AND METHODS FOR CREATING SCALABLE PRESENCE SUBSCRIPTIONS IN FEDERATED PRESENCE ENVIRONMENTS

BACKGROUND

While initially developed as a means for communicating the "online status" in instant messaging applications, presence has become a key enabler of web-based content provider converged applications (for example, GOOGLE TALK® and SKYPE® applications), enterprise converged applications (for example, SAMETIME® application) and service provider/telephone company converged applications (for example, Push-to-talk applications). GOOGLE TALK is a registered trademark of Google Inc. in the United States and other countries. SKYPE is a registered trademark of Skype Limited Corp. in the United States and other countries. SAMETIME is a registered trademark of International Business Machines Corp. in the United States and other countries.

Presence, broadly defined as an event publish-notification infrastructure for converged applications, has emerged as a key mechanism for collecting and disseminating context attributes for next-generation services in both enterprise and provider domains. Presence can be viewed as the ability of a communications infrastructure to both track and disseminate a variety of dynamic attributes of individuals, objects and/or devices. Common examples of presence information include but are not limited to a status update on a social network (as for example "user A is away") and/or a location update for an object (as for example "taxi 123" is now located in "geographic area A"). Given the large amount of presence information available and its apparent usefulness in a variety of contexts, obtaining, organizing and disseminating presence information in useful ways is highly desirable.

BRIEF SUMMARY

In summary, one aspect provides a method for creating scalable presence subscriptions in a federated and virtualized presence environment comprising: receiving a query from a client device over a network; decomposing a membership set inside the query into existing membership sets; determining if one or more existing query processing cells can be reused to satisfy the query; creating a new query processing cell to satisfy the query; obtaining presence information according to the query; and returning the presence information as a query response to the client device over the network.

Another aspect provides a computer program product for creating scalable presence subscriptions in a federated and virtualized presence environment comprising: computer readable program code configured to receive a query from a client device over a network; computer readable program code configured to decompose a membership set inside the query into existing membership sets; computer readable program code configured to determine if one or more existing query processing cells can be reused to satisfy the query; computer readable program code configured to create a new query processing cell to satisfy the query; computer readable program code configured to obtain presence information according to the query; and computer readable program code configured to return the presence information as a query response to the client device over the network.

A further aspect provides an apparatus for creating scalable presence subscriptions in a federated and virtualized presence environment comprising: one or more processors; and a memory operatively connected to the one or more processors; wherein, responsive to execution of computer readable program code accessible to the one or more processors, the one or more processors are configured to: receive a query from a client device over a network; decompose a membership set inside the query into existing membership sets; determine if one or more existing query processing cells can be reused to satisfy the query; create a new query processing cell to satisfy the query; obtain presence information according to the query; and return the presence information as a query response to the client device over the network.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
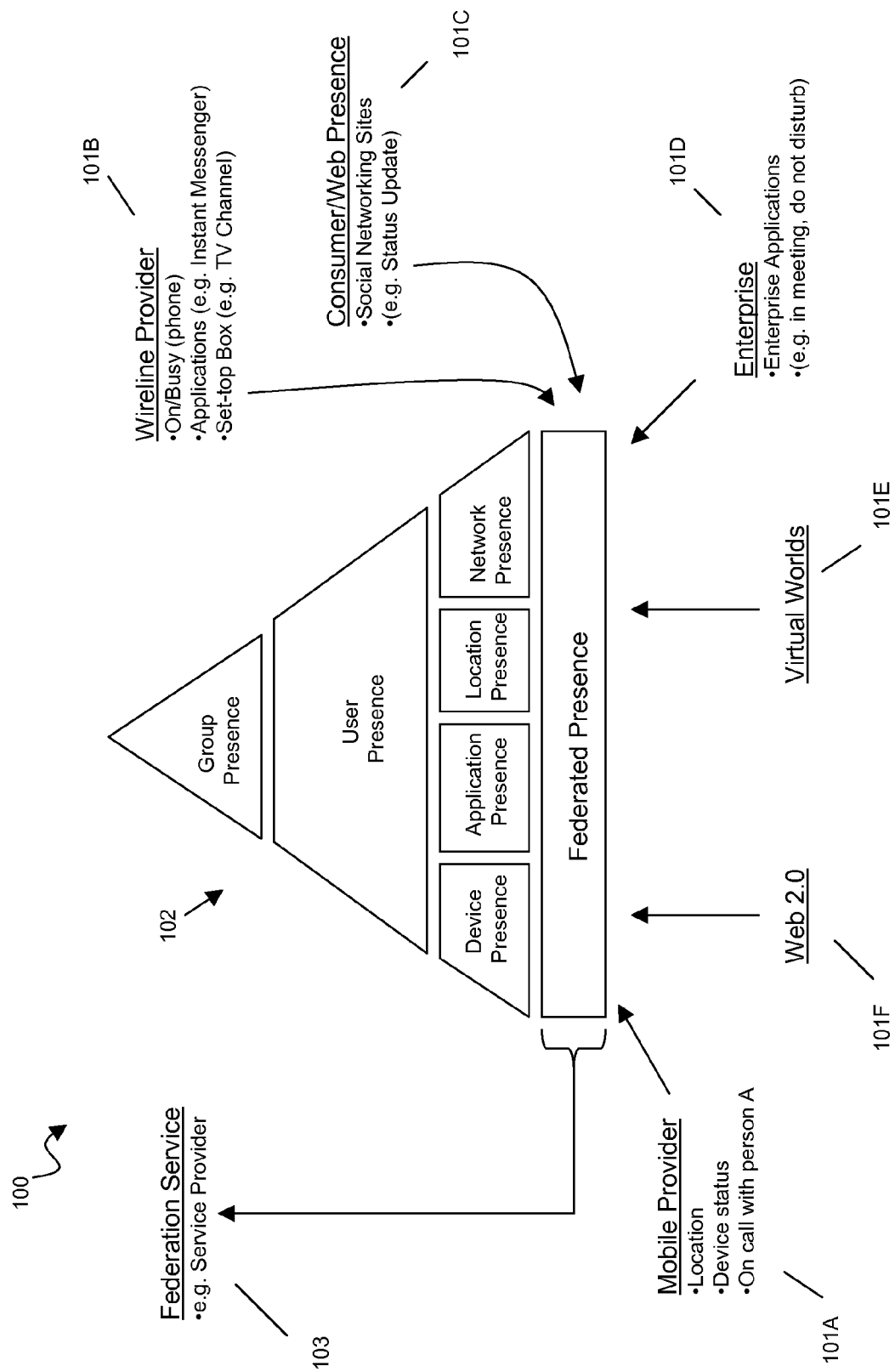
FIG. 1 illustrates an example federated presence environment.

It will be readily understood that components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of various example embodiments.

Reference throughout this specification to "one embodiment" or "certain embodiments" (or the like) means that a particular feature, structure, or characteristic described in connection with the embodiment is included in at least one embodiment. Thus, appearances of the phrases "in certain embodiments" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that various embodiments can be practiced without one or more of the specific details, or with other methods, components, materials, et cetera. In other instances, well-known structures, materials, or operations are not shown or described in detail to avoid obfuscation.

Additional information on presence system(s) can be found elsewhere, for example in co-pending and commonly assigned U.S. application Ser. No. 12/792,360, entitled "Standard Integrated Service Assurance Using Virtualized Federated Presence Infrastructure", filed on Jun. 2, 2010, and in Acharya et al, *Programmable Presence Virtualization for Next-Generation Context-Based Applications*, IEEE International Conference on Pervasive Computing and Communications, 2009, 9-13 Mar., page 1-10, both of which are incorporated by reference here. To make the description self contained, a brief description of an example presence system is provided below along with some clarification of commonly used terms.

The term "presentity" as used herein is intended to be construed broadly so as to encompass, by way of example and without limitation, an entity identified by presence information and that is associated with a unique resource identifier or indicator (for example, a URI). The word is a combination of words "presence" and "entity" and was first introduced in by the Internet Engineering Task Force (IETF).

The term "virtual presentity" as used herein is intended to be construed broadly so as to encompass, by way of example and without limitation, a presence entity that is created by a virtual presence server (VPS), or some external source, in response to some specified computing logic or query operating over the aggregated presence information of specified presentities, such that the attributes of the virtual presentity correspond to answers, either wholly or partially, to the specified computing logic.

In contrast, "non-virtual" or "real" presentities correspond to presence entities that exist independently of an external query. For example, presentity for a social network web site captures the state (such as a status update) of the social network web site independently of the queries or interests expressed by any other entity, device or computing system.

The "virtual presentity" may thus be viewed as a presence-based abstract view, corresponding to some computing logic, expressed over aggregated presence information of other presentities (both "real" and "virtual") or external data sources. Thus, it is to be understood that the VPS is preferably a physical server that handles virtual presentities in the manner described herein.

A presence virtualization architecture, where a VPS receives customizable queries from multiple presence clients (for example, end user devices), retrieves the necessary data from the base presence servers (PS), applies the required virtualization logic and notifies the presence clients in the form of query responses. To support both query expressiveness and computational efficiency, virtualization queries can be structured to separately identify both the XSLT based transformation primitives and the presence sources over which the transformation occurs. A level of scalability has been achieved by an architecture that offloads the XSLT-related processing to a high-performance XML processing engine. While virtualization approaches are promising, further improvements in scalability are desirable.

The description now turns to the figures. The illustrated example embodiments will be best understood by reference to the figures. The following description is intended only by way of example and simply illustrates certain example embodiments representative of the invention, as claimed.

Referring to FIG. 1, a federated presence environment 100 is illustrated. Presence information is available from a variety of sources 100A-F. These sources can include for example mobile 100A and wireline 100B providers, which may have available presence information such as location of devices, application statuses and the like. Moreover, the sources can include for example consumer or web presence sources 101C such as social networking sites, which similarly have application statuses, or enterprise application sources 101D indicating worker status. Additional sources can include but are not limited to web 2.0 applications 101F and/or virtual world applications 101E, for example user status information from an online gaming environment.

These sources of presence information 101A-F can communicate the presence information (for example, status update information) into a federation service 103. The presence information can be organized in a variety of ways, such as a hierarchical organization 102 where a user's various devices and applications contribute to a user's presence information, and a plurality of users contribute to a group's presence information. The organization shown in FIG. 1 is only by way of example. The federation service 103 thus provides presence information derived from the individual sources.

Figure 2:
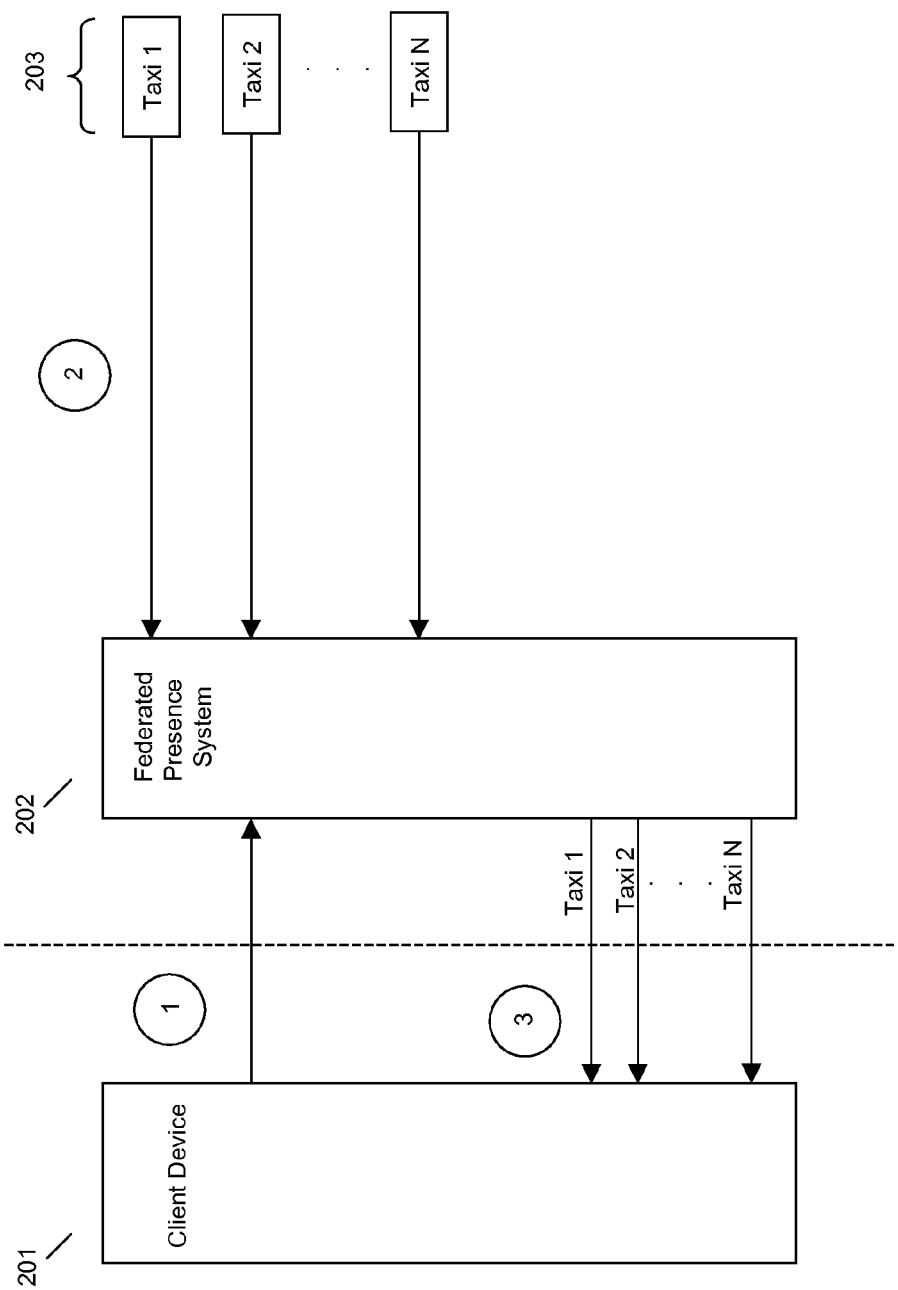
FIG. 2 illustrates an example federated presence system.

Referring to FIG. 2, a federated presence system is illustrated. As an example, a user may be interested in finding the closest taxicab. Using a client device 201 such as a smart phone, the user issues a query (1) to a presence system 202 to find the closest taxicab relative to the client device's 201 position. The presence system 202 collects (2) presence information from taxicabs 203. The presence system 202 is thus in a position to respond (3) to the client device 101 with presence information for the taxicabs 203, that is, the location information for each. The client device 201 thus can receive the presence information and utilize it to calculate the relative locations and thus the closest taxicab.

However, the presence system 202 in this context is providing low-level presence information to the end user device's application. That is, the presence information that is provided to the client device 201 by the presence system includes the real time locations of the taxicabs 203. The client device 201 uses this presence information to calculate the closest taxicab to it. It can be appreciated that when a plurality of client devices each issue such a query, the presence system 202 will respond in kind with the presence information for each. Thus, as the amount of queries grows, the presence information that the presence system is required to communicate grows quickly. Moreover, the real time locations of the presentities (taxicabs in this example) may change frequently, necessitating many updates.

Accordingly, embodiments broadly contemplate systems and associated methods for providing scalable presence subscriptions in federated presence environments. Embodiments provide for intelligent addition of subscriptions to a presence system. Essentially, embodiments identify if a virtualized presentity (corresponding to a new query) can be composed from existing virtualized presentities, and if so, corresponding virtual presentities servicing existing queries are reused to retrieve the presence information (partially or fully) for the new incoming query. Embodiments organize the existing virtual presentities into a hierarchy such that a virtual presentity at a higher layer fetches presence information of all or some presentities from virtual presentities at lower layer(s) to service the new query.

Figure 3:
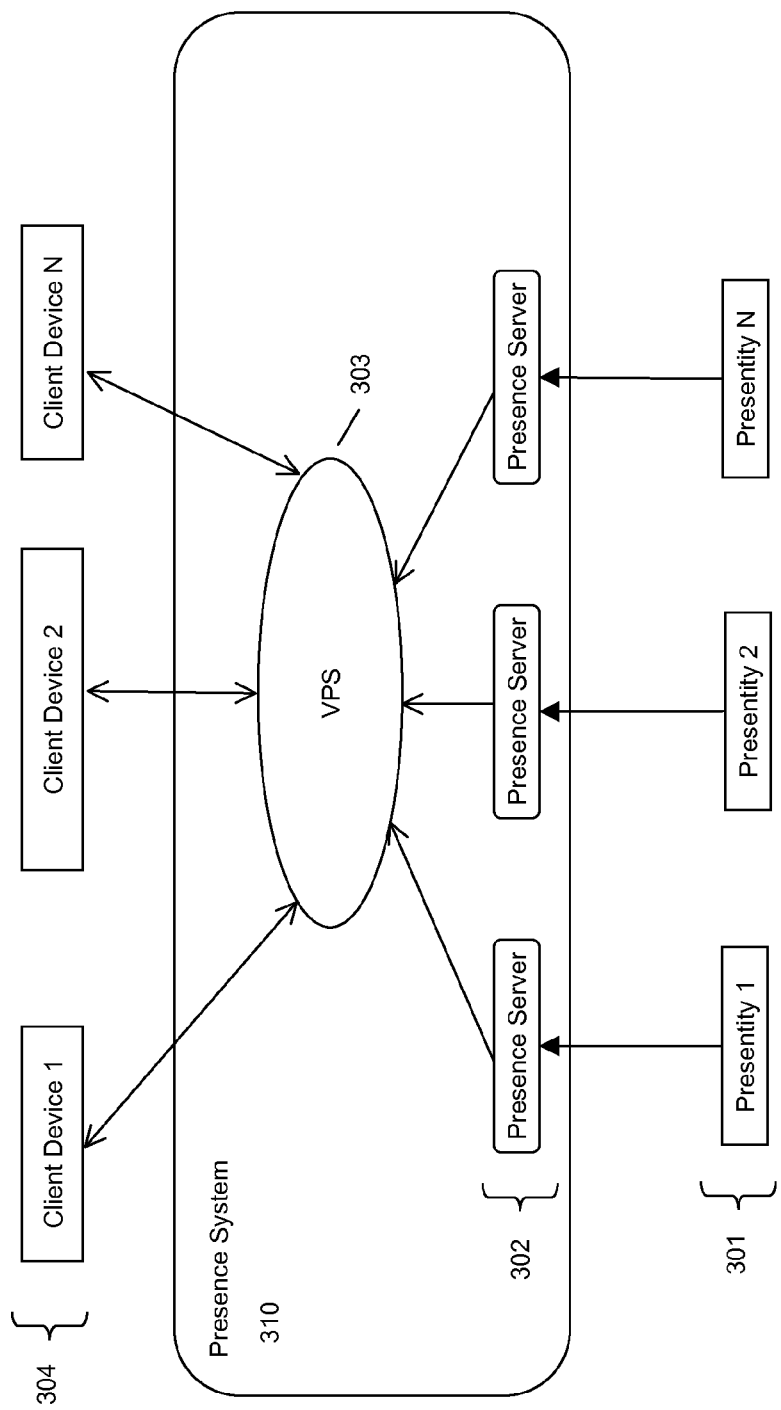
FIG. 3 illustrates an example presence system for scalable presence subscriptions.

Referring to FIG. 3, a presence system 310 according to embodiments is illustrated. The presence system 310 includes one or more presence servers 302 that store presence information from one or more presentities 301. Note that these presence servers can be located in different domains. The presentities 301 include for example devices running applications that produce presence information. For example, the presentities 301 may include a mobile device running a GPS application that provides location information as presence information to one or more presence servers 302.

The presence system 310 further includes a VPS 303 that virtualizes the presence of presentities 301, that is, creates virtual presentities. The VPS 303 receives queries from one or more client devices 304 for presence information regarding the presentities 301. For example, the client devices 304 may query to receive information regarding the location of the closest presentity among the set of presentities 301.

According to embodiments, the VPS 303 virtualizes the presentities as virtual presentities according to the query received. For example, if a client device 304 subscribes to a virtual presentity including presentities 1 and 2 as a set, the VPS 303 associates this query with the virtual presentity that includes presentity 1 and 2 as a member set. Thus, the VPS can provide presence information in the form of query answer(s) to the client device 304, as for example in the form of the closest presentity from the member set.

The VPS 303 implements the calculations (in this example, for determining the closest presentity to the client device that issued the query). Therefore, the developer of a client side application, such as in this example of a closest taxicab application for a client device 304, needs only to specify a high level query to the VPS 303 rather than spend time developing logic for the application to calculate the closest presentity given raw presence information. Thus, application and/or service development is much easier since the application and/or service need only deal with high level subscription queries and does not involve handling lower level presence information/data (raw presence data). Moreover, embodiments provide for improved scalability. Communication between the application and/or service running on the client device and the presence system is limited to high level query-response communications, rather than propagating every notification available from a presence server (such that the application can perform the necessary calculations). Accordingly, when a client device 304 subscribes to a member set for query answers, the VPS 303 can be configured to communicate updates only responsive to a true change (for example, a new presentity is now closest).

Embodiments thus provide a virtualized presence infrastructure in which clients specify high level queries that essentially include two parts: (1) a set of presentities (referred to herein as a membership set (MS)); and (2) a query (referred to herein as a transformation function (TF)). A virtual presentity is created by the presence system to handle a client's query. The physical entity that acts as the virtual presentity is referred to herein as a query processing cell (QPC). The QPC operates on a unique MS and collects presence data for members of the MS. The QPC applies transformation logic on aggregated presence information of all members of the MS. QPC then sends back a notification to the client(s) subscribing to the MS.

Figure 4:
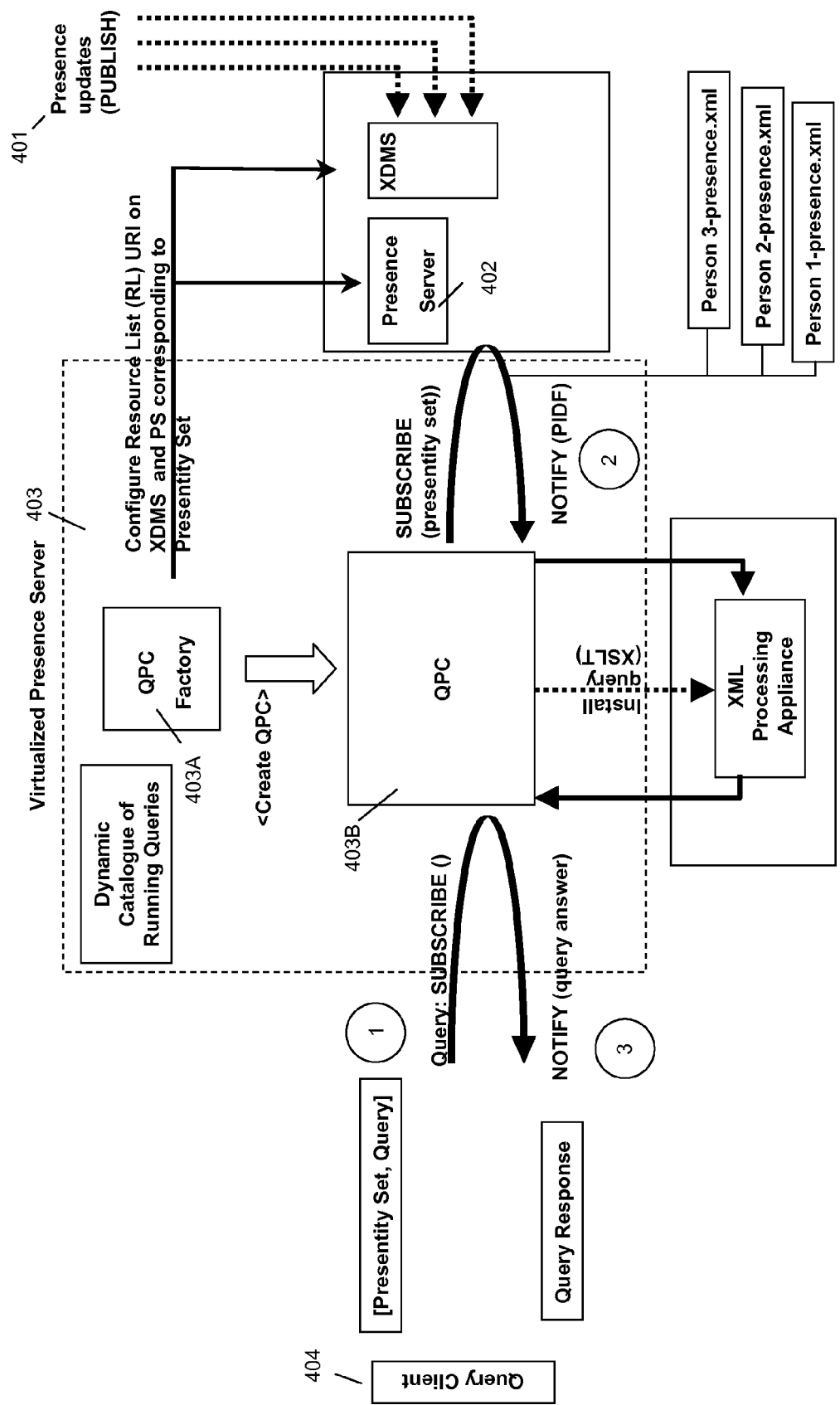
FIG. 4 illustrates an example virtual presence server.

Referring to FIG. 4, a virtualized presence infrastructure according to embodiments is illustrated. As illustrated, a variety of presentities 401 publish presence updates to a presence server 402. A group management appliance (for example, XDMS) can be included. The presence server 402 stores the presence information and makes it available to a VPS 403.

The VPS 403 for its part includes a QPC factory 403A and one or more QPCs 403B (only one is illustrated in FIG. 4 for simplicity). When a query client 404 issues a query (1) to the VPS 403, the QPC factory 403A consults a catalogue of running queries to determine if the new query can be answered using existing/running queries (either as is or using some combination of existing QPCs 403B). The query comes as a subscribe request (Table 1 includes an example subscribe or subscription request) to a MS and a TF operating on that MS.

Responsive to determining which, if any, existing QPCs can be leveraged to answer the query, the QPC factory 403A dynamically creates a virtual presentity (QPC 403B is the physical manifestation of the virtual presentity) to answer the new query. This is accomplished by determining the members of the MS of the new query and additionally determining how to collect the MS presence information required to answer the new query given the existing QPCs. The dynamically created QPC 403B in turn subscribes (2) to retrieve present data for a membership set corresponding to the MS of the new query. The QPC 403B will thus receive presence notifications (an example notification is included in Table 1) from the PS 402 as new presence updates for the members of that set are published and apply the TF logic to this presence data. The example illustrated in FIG. 4 is a MS including Person 1, Person 2, and Person 3. The presence information may include for example status updates. The QPC 403B will in turn notify (3) the query client 404 in the form of a query response, for example when presence updates are available. Table 1 includes an example query response.

TABLE 1

| [MembershipSet, Query] | Notification | Query Response |
|---|---|---|
| <?xml version="1.0" ?><br><xsl:stylesheet xmlns:xsl=<br>http://www.w3.org/1999/XSL/Transform<br>. . . .<br><xsl:template match=<br>  "pidf:presence[pidf:tuple/@id =<br>  'SametimeStatus']<br>  [pidf:tuple/pidf:status/im:im =<br>  'available']<br>  [pidf:tuple/pidf:status/myex:location =<br>  'watson']"><br>  <value><xsl:value-of<br>select="@entity"/></value><br>  </xsl:template><br><xsl:template<br>match="pidf:presence"></xsl:template><br></xsl:stylesheet> | Alice-presence.xml<br><presence<br>xmlns="urn:ietf:params:xml:ns:pidf"<br>. . . .<br>entity="pres:abc123@us.ibm.com"><br><tuple id="SametimeStatus"><br><status><br><basic>open</basic><br><im:im>busy</im:im><br><myex:location>watson</myex:location><br></status><br></tuple><br></presence> | <?xml version="1.0" encoding="UTF-8"?><br><resource_list<br>xmlns:myex="http://lspf.ibm.com/presence/"<br>xmlns:im="urn:ietf:params:xml:ns:pidf:im"<br>xmlns:pidf="urn:ietf:params:xml:ns:pidf"<br>><br><value>pres: abc123@ibm.com</value><br></resource_list> |

Figure 5:
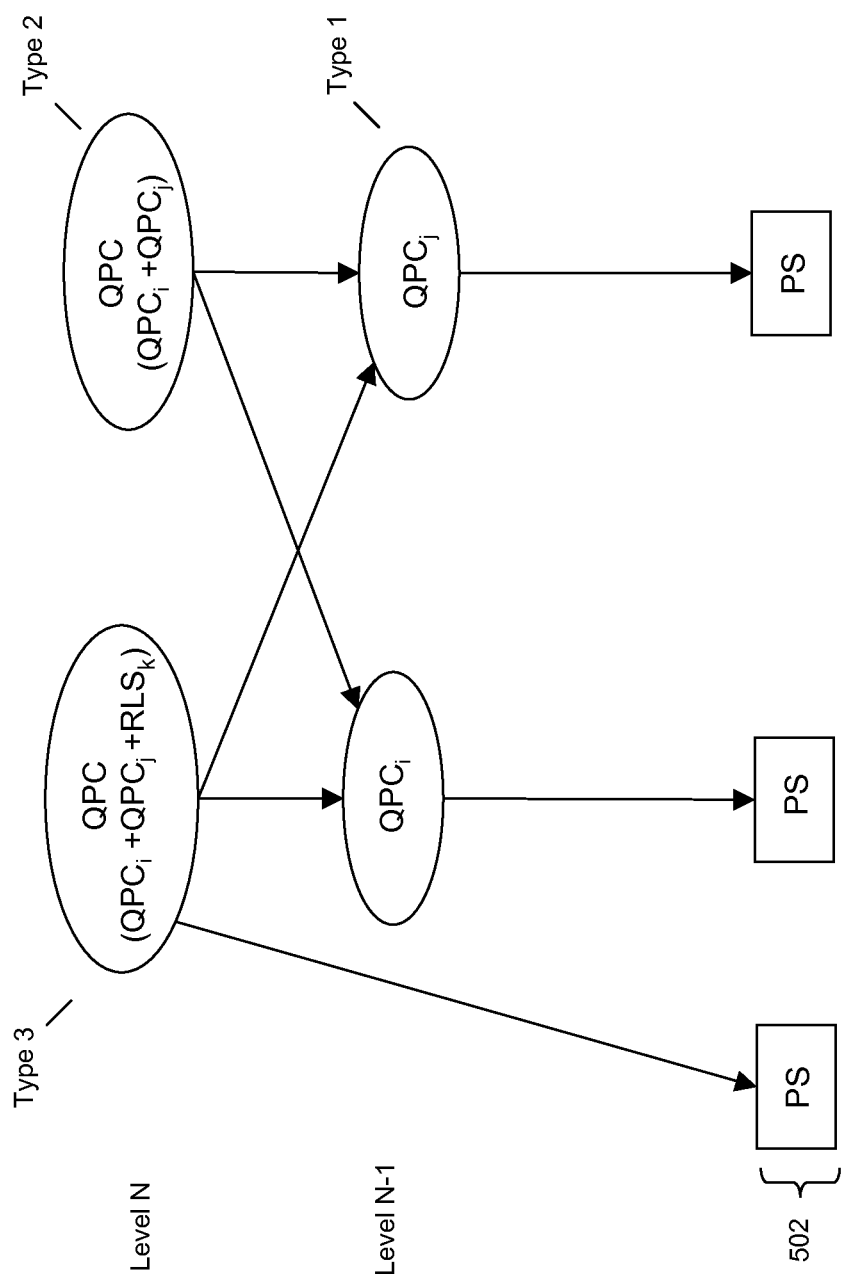
FIG. 5 illustrates an example query processing cell hierarchy.

Referring now to FIG. 5, three types of dynamically created QPCs are illustrated. A first type (Type 1) of QPC receives presence information directly from one or more presence servers 502, as in a federated presence system. These QPCs are at the bottom of the hierarchy (level N−1). The Type 1 QPC thus directly subscribes for presence information from the presence server 502. A QPC factory creates a Type 1 QPC to answer a new query that is not yet covered by any existing QPC within the presence system. A second type (Type 2) QPC receives presence information from one or more existing QPCs. Thus, the Type 2 QPC need not directly subscribe to a presence server 502 in order to receive presence information of a MS. A QPC factory, to answer new queries that are already covered by existing QPCs, dynamically creates Type 2 QPCs. A third type (Type 3) QPC receives presence information from both an existing QPC (for example, a Type 1 QPC) and directly from one or more presence servers 502. Type 3 QPCs are dynamically created by a QPC factory to answer new queries that are not completely (or are partially) covered by existing QPCs within the presence system. Thus, embodiments dynamically create QPCs with a QPC factory to intelligently leverage the existing QPCs within the system.

Embodiments decompose a new MS of a new query into existing MSs where possible. The query elements (QPCs) are organized in a hierarchy (such as that illustrated in FIG. 5) to optimally use the common members of each MS of each query. A hierarchy management table (HMT) is created by the presence system (and can be stored in the dynamic catalogue of running queries). The HMT acts as a repository of all existing MSs and information about the query elements (for example, existing interconnectivity). While a variety of methods can be implemented to incorporate a new query into the hierarchy of QPCs, a greedy set cover approach and adaptive weighted set cover approach are described in the Appendix as non-limiting examples.

Multi-QPC Scenario and Reuse

Each QPC has its own MS on which it operates. If an incoming new query has all members of its MS the same as that of an existing QPC's MS, then the incoming MS of the new query is equivalent to an existing MS. If an incoming new query has all members of its MS in an existing QPC's MS, then the incoming MS of the new query is a subset of an existing MS. If an incoming new query has all or some of its MS in more than one QPC, then the incoming MS of the new query has some members present in an existing QPC but is neither an equivalent set nor a subset of an existing MS.

Example steps for reusing QPCs are as follows. On receiving a new query, the QPC determines (for example via a catalogue lookup) if there exists a QPC having an equivalent MS or a subset MS. If an equivalent MS or a subset MS is identified, the QPC factory redirects the client query to an existing QPC. This also facilitates reuse of an installed TF inside the existing QPC. On receiving the query, the QPC checks if the same TF exists in that QPC. If the TF already exits, the client query can simply be redirected to the TF URI. Hence, the QPC design permits clients to reuse both the data and transformation logic, thus helping in providing scalability.

The QPC also supports identity transformation. Identity transformation refers to a reserved transformation logic whose application on membership set results in aggregation of presence documents of all members of the set. There are multiple ways to implement identity transformation, for example writing such a XSLT code, reserving unique identifier (for example, a string), et cetera. If a client sends a query with identity transformation, the QPC returns the aggregated presence document of all members of the MS. This feature of QPC design is useful for supporting cases in which the MS of a new query has all or some of its MS in more than one QPC (that is, the incoming MS of the new query has some members present in an existing QPC but is neither an equivalent set nor a subset of an existing MS).

Hierarchical Model of QPCs

Let $P=\{P_1, P_2, \ldots, P_N\}$ be the set of N presentities publishing to the presence server(s). Let $M=\{MS_1, MS_2, \ldots, MS_M\}$ be the collection of existing MSs. Let $Q=\{QPC_1, QPC_2, \ldots, QPC_M\}$ be the set of M QPCs running inside the VPS corresponding to collection M.

For each $QPC_i \in Q$ there exists $MS_i \subseteq P$ and a transformation function $TF_i$. The members of Q are organized in an arbitrary hierarchy H. When a new query enters into the VPS with membership set of $MS_0$ and transformation function of $TF_0$, then the problem becomes attaching the new QPC ($QPC_0$) to the hierarchy H.

There are four different possibilities:

(1) If $MS_0=MS_n$ and $TF_0=TF_n$, here subscript n refers to an existing $QPC_n$, the QPC factory redirects the client query to existing QPC URI and the QPC redirects the client query to existing TF URI.

(2) If $MS_0=MS_n$ and $TF_0 \neq TF_n$, the QPC factory redirects the client query to an existing QPC URI, the QPC installs the new TF ($TF_0$), and the QPC redirects the client query to $TF_0$ URI.

(3) If $MS_0 \neq MS_n$ and $TF_0=TF_n$, then the QPC factory creates a new QPC ($QPC_0$) and redirects the client query to new $QPC_0$ URI. $QPC_0$ installs $TF_0$ and subscribes to one or more QPCs and to one or more PSs. $QPC_0$ redirects the client query to $TF_0$ URI.

(4) If $MS_0 \neq MS_n$ and $TF_0 \neq TF_n$, then the QPC factory creates a new QPC ($QPC_0$) and redirects the client query to new $QPC_0$ URI. $QPC_0$ installs $TF_0$ and subscribes to one or more QPCs and to one or more PSs. $QPC_0$ redirects client to $TF_0$ URI.

The above two cases (3) and (4) can lead to the scenario when $MS_0=MS_0^{in}+MS_0^{out}$ where $$MS_0^{in} = \bigcup_{i=1}^{M} MS_i \text{ and } MS_0^{out} \subseteq P.$$

This requires (i) determining the list of membership sets (the exact problem definition and two possible algorithms are in the Appendix) from which $MS_0$ can be composed from. (ii) building inter QPCs communication. The mechanism for inter QPCs communication is same as the one used to interact with external clients (that is, the devices or applications outside presence system). The sender QPC constructs a query (just like the external source) and sends it to other QPC. The advantage with such an approach is the uniformity it brings to the design.

Referring back to case 3) and 4) above, QPC factory determines the list of membership sets from which $MS_0$ can be composed from and sends it to $QPC_0$. $QPC_n$ is one such query processing cell in the list with membership set as $MS_n=\{P_1, P_2, \ldots, P_K\}$. Then some members of $MS_0$ belong to $MS_n$. If $QPC_0$ constructs a new query with membership set $\hat{MS}_0 \subseteq MS_0$ where $\hat{MS}_0=\{P_1, P_2, \ldots, P_{K1}\}$, K1<K and includes and identity transformation function in query. $QPC_0$ then sends this query to $QPC_n$. $QPC_n$ upon receiving identity transformation in the query returns aggregated presence document of members of $\hat{MS}_0$ as response to $QPC_0$.

Figure 6:
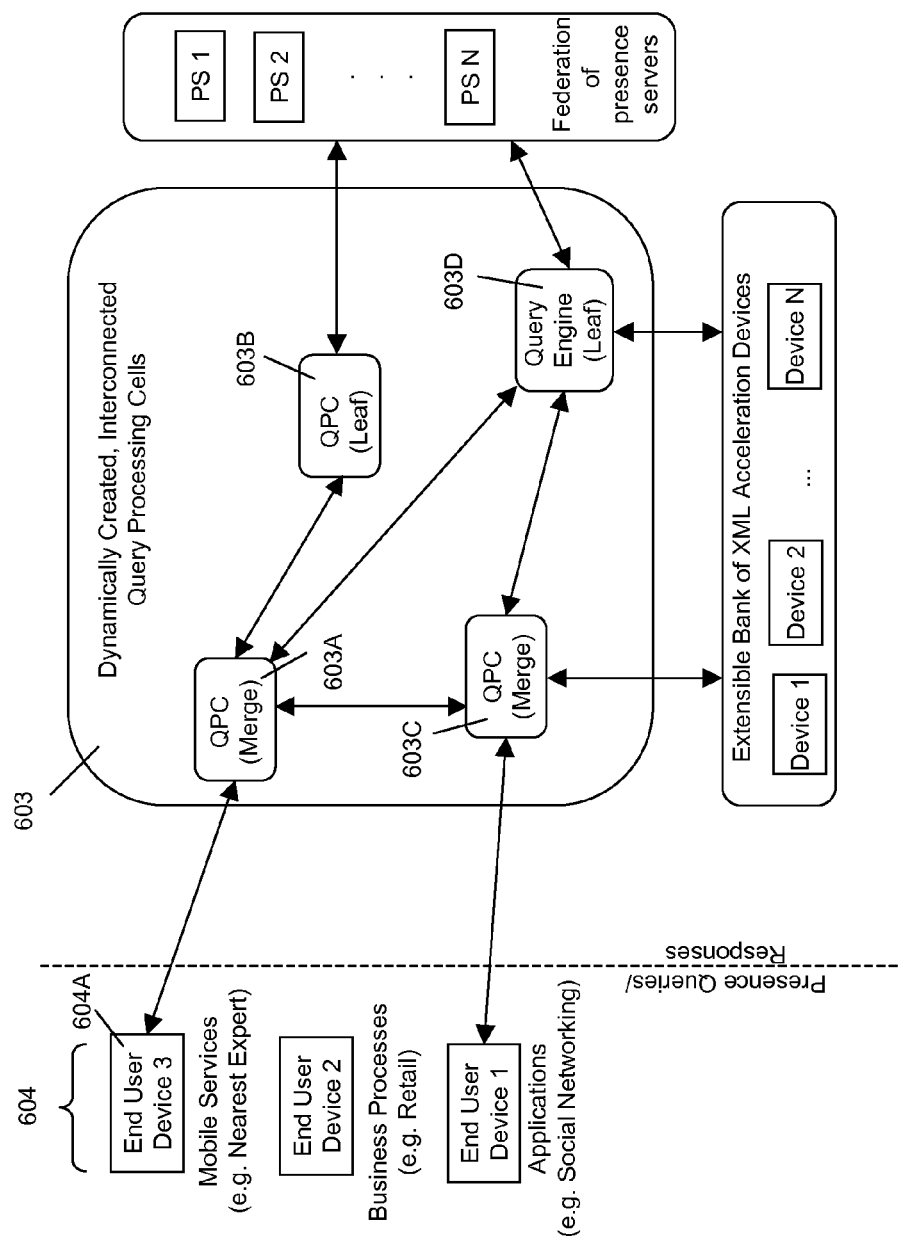
FIG. 6 illustrates an example presence system for scalable presence subscriptions.
Figure 7:
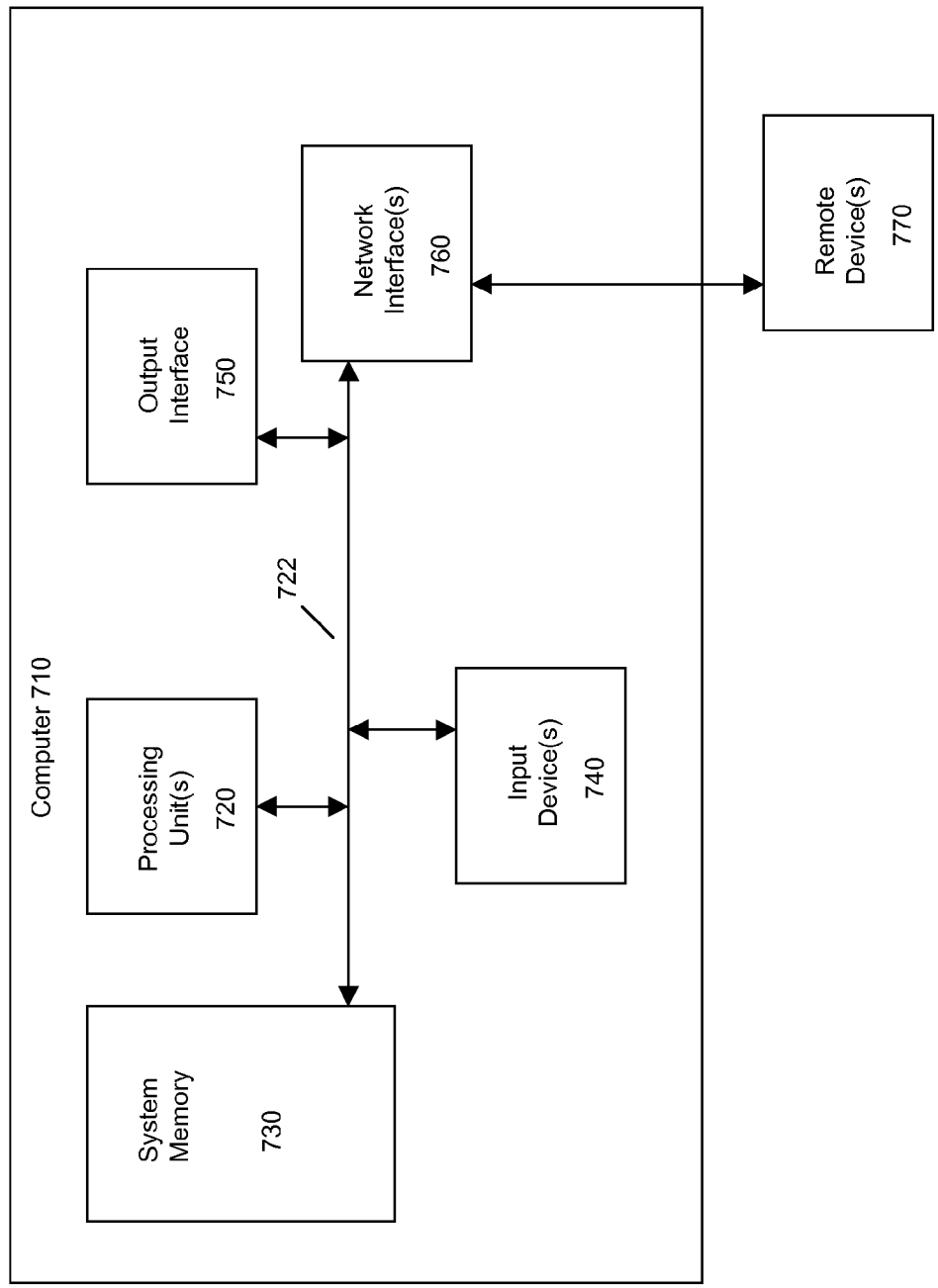
FIG. 7 illustrates an example computer system.

Referring to FIG. 6, an example of dynamically created, interconnected QPCs answering queries is illustrated. End user devices 604 issue queries to a VPS 603. The VPS is comprised of a plurality of QPCs. For example, end user device 604A issues a query to VPS 603. VPS QPC factory (not shown) determines, as above, if the new query can reuse one or more existing QPCs. Responsive to this determination, the new query is directed to an appropriate QPC. In this example, the new query is directed to QPC 603A. QPC 603A is a Type 2 QPC, which receives presence information of the MS of the new query that is covered by QPCs 603B, 603C, and 603D. Thus, QPC 603A is for example dynamically created for new query responsive to determining that the its MS is included in the combination of QPCs 603B, 603C, and 603D. Thus, QPC 603A need not contact any presence servers directly for presence information, as it is already being collected by the hierarchy of QPCs. Once QPC 603A has received presence information, it notifies end user device 604A as a query response.

Thus, the new MS defined by the new query of end user device 604A can be decomposed into exiting MSs of existing QPCs 603B, 603C, 603D. The QPCs 603A-D are organized into the hierarchy to optimally use the commonality between the MSs. In order to determine the proper placement/connectivity within the hierarchy of QPCs, an appropriate method (for example a greedy set cover or adaptive weighted set cover) finds the collection of QPCs that covers a maximum number of presentities of the new query's MS. Thus, the clients (for example, end user device 604A) are unaware of the disintegration and reutilization of MSs. As above, this frees up application developers to create applications that only need send a high level query to the VPS 603.

It will be readily understood that certain embodiments can be implemented using any of a wide variety of devices or combinations of devices. An example device that may be used in implementing one or more embodiments includes a computing device in the form of a computer 710. In this regard, the computer 710 may execute program instructions configured to receive queries, dynamically create virtual presentities to optimally answer queries, provide presence information in response to queries, and perform other functionality of the embodiments, as described herein.

Components of computer 710 may include, but are not limited to, a processing unit 720, a system memory 730, and a system bus 722 that couples various system components including the system memory 730 to the processing unit 720. Computer 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote computers or databases, such as databases storing presence information or virtualized presence information. The logical connections may include a network, such local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

APPENDIX

In VPS, there exists a collection of already existing membership sets $M=\{MS_1, MS_2, \ldots, MS_M\}$. The corresponding set of QPCs is Q. When a new query enters into the system with membership set $MS_0$ (which is divided into $MS_0^{in}$ and $MS_0^{out}$), the problem is to find a minimum cardinality set cover C which is subset of M and whose union is $MS_0^{in}$. The well-known Greedy Set Cover algorithm is described below:

Greedy Set Cover
Input: M, $MS_0$
Step1: $C=\emptyset$, $MS_0^{out}=\emptyset$;
Step2: Sort M in descending order of sizes of each element set
Step3: while ($M \neq \phi$ or $MS_0 \neq \phi$)
Step 3.1: Remove first element $MS_i$ of M
Step 3.2: If ($MS_0$ contains some elements of $MS_i$) then
Step 3.2.1: Add $MS_i$ to C
Step 3.2.2: $MS_0 = MS_0 / MS_i$
Step4: If ($M=\phi$ and $MS_0 \neq \phi$) then
Step 4.1: $MS_0^{out} = MS_0$
Output: C, $MS_0^{out}$ The newly created query processing cell $QPC_0$ sends SUBSCRIBE to all QPCs corresponding to member sets of C and to presence server for members of $MS_0^{out}$. The $QPC_0$ is inserted into hierarchy.

The Greedy Set Cover algorithm results in skewed distribution of load among QPCs (always choosing the one with maximum membership set cardinality). One then needs to develop QPC load aware set cover algorithm. In order to do so, one can define the load/flow of a QPC as, Flows The weight or flow of a QPC is sum of its inflow and outflow, flow=Inflow+Outflow Inflow of a QPC is defined as the total number of NOTIFYs it receives for all its presentities (that is, its MS members), $$\text{Inflow} = \sum_{i=1}^{n} U_i$$

where n is the cardinality of MS of QPC and $U_i$ is the update(s) for presentity.

The outflow of a QPC is sum of number of NOTIFYs it sends to other QPCs, that is:

$$\text{Outflow} = \sum_{i=1}^{n} S_i U_i$$

where $S_i$ is the count of SUBSCRIBEs QPC receives for presentity $P_i$ and $U_i$ is the count of updates for presentity $P_i$.

The flow/load for a QPC is not fixed but changes with time and hence needs to be computed. Based on above definition of flow/load, Adaptive Weighted Set Cover algorithm is:

Adaptive Weighted Set Cover
Input: Q, $MS_0$
Step1: $C=\emptyset$, $MS_0^{out}=\emptyset$;
Step2: Sort Q in ascending order of weight of each element
Step3: while ($Q \neq \phi$ or $MS_0 \neq \phi$)
Step 3.1: Remove first element $Q_i$ of Q
Step 3.2: Extract $MS_i$ of $Q_i$
Step 3.3: If ($MS_0$ contains some elements of $MS_i$) then
Step 3.3.1: Add $Q_i$ to C
Step 3.3.2: $MS_0 = MS_0 / MS_i$
Step4: If ($Q=\phi$ and $MS_0 \neq \phi$) then
Step 4.1: $MS_0^{out} = MS_0$
Output: C, $MS_0^{out}$ The newly created query processing cell $QPC_0$ sends SUBSCRIBE to all QPCs of C and to presence server for members of $MS_0^{out}$. The $QPC_0$ is inserted into hierarchy H. The load of the QPC/s is not constant but varies with time thus the name adaptive weighted set cover.

As a non-limiting example, an implementation is described below along with some comparisons between the greedy set cover approach and the adaptive weighted set cover approach. The adaptive weighted set cover approach is presently preferred.

Figure 8:
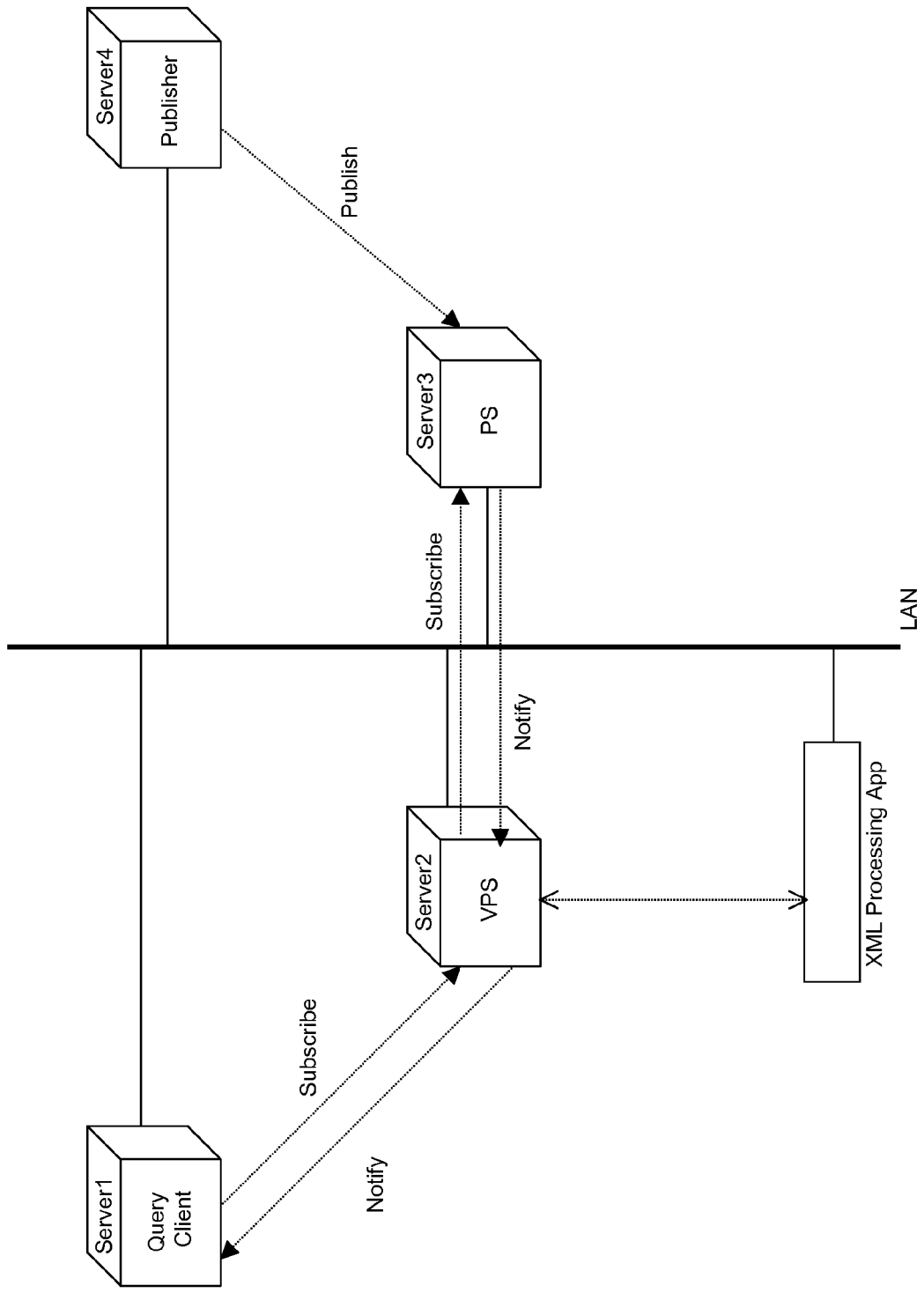
FIG. 8 illustrates an example test bed set up.

For the example implementation, the following server configurations were utilized (with reference to FIG. 8). Servers Configuration: Server1, Server2, Server4: Intel® Xeon™ CPU 3.40 GHz×2; Cache 2 MB for each; 5 GB Memory. Server3: Intel® Xeon™ CPU 3.40 GHz×2; Cache 2 MB for each; 7 GB Memory. Each Server ran Red Hat Enterprise Linux AS release 4 and IBM Java 5.0.

Figure 9A:
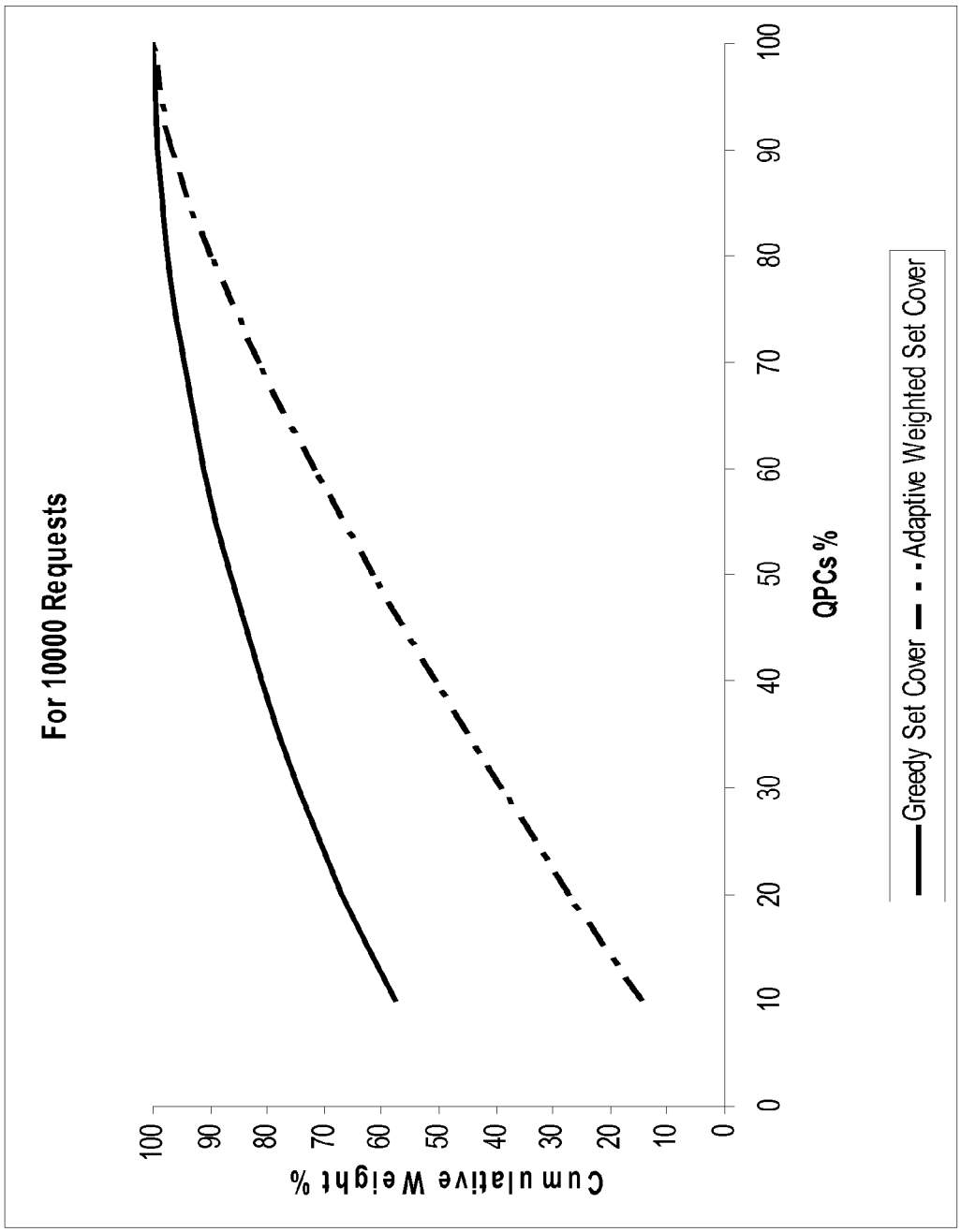
FIG. 9(A-B) illustrates example performance results.
Figure 9B:
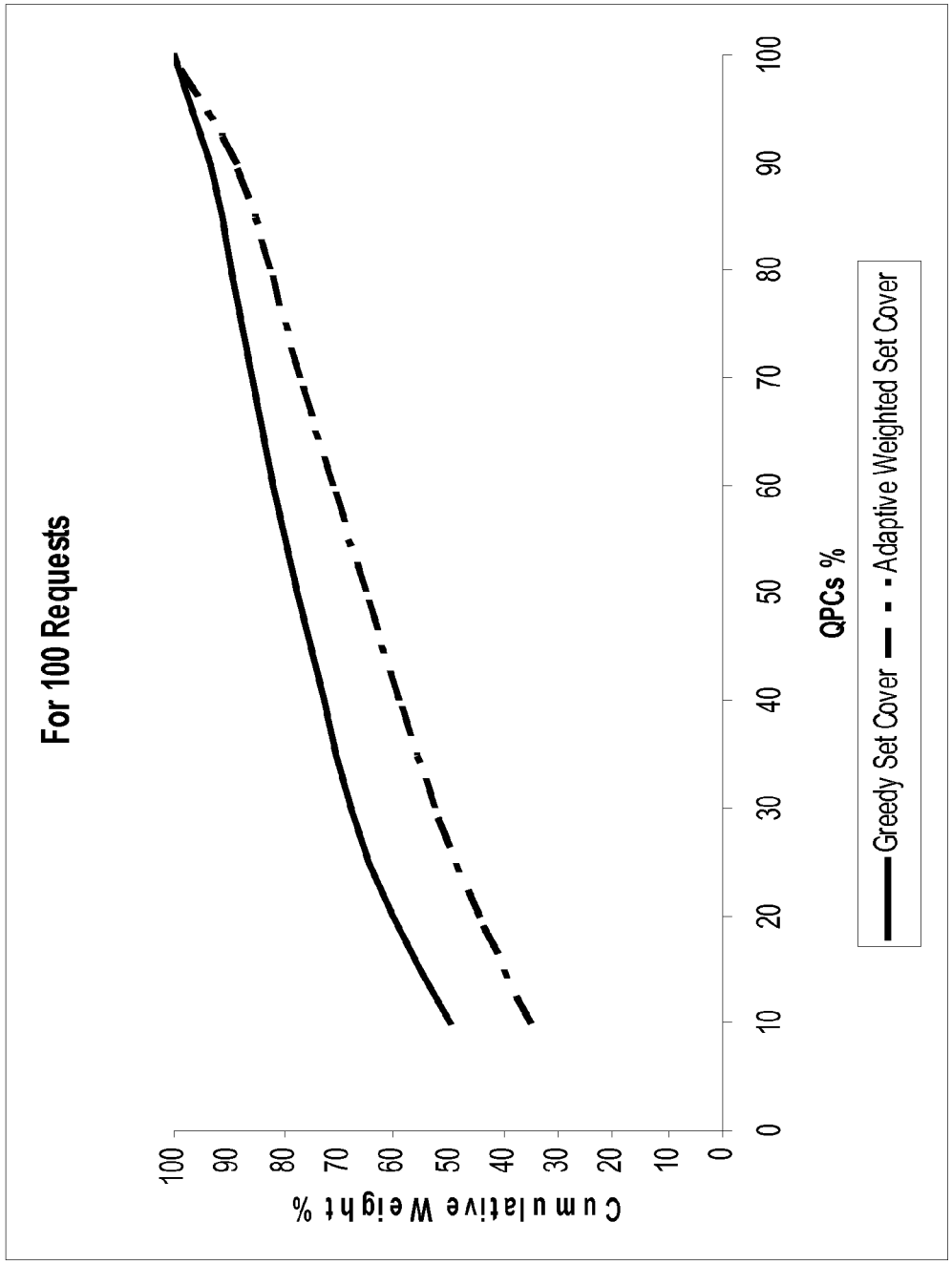

For the Query Client, a query rate of 12 queries per minute was utilized. Presentities in a MS were chosen following Pareto distribution with a scale parameter of 1.5. Cardinality of the presentity universe was set to 100. The publisher rate was set to 10 publishes per second and 2 publishes per second, respectively. Performance results for simulations and test-bed evaluations are illustrated in FIG. 9(A-B) and in tables 2 and 3 below.

Some details for the example implementation are as follows.

Functionality as Parent QPC:

$QPC_0$ factory creates $QPC_0$ and passes QPC List and $MS_0^{out}$ to it. $QPC_0$ sends SUBSCRIBEs to all members of QPC List. Each of these query SUBSCRIBE messages contains some subset $M\hat{S}_0 \subseteq MS_0$ and identity transformation function that returns aggregated presence document of member of $\hat{MS}_0$. It also subscribes to presence server for members of $MS_0^{out}$.

$QPC_0$ receives SUBSCRIBE request from client with a transformation function $TF_0$. $QPC_0$ installs $TF_0$ in XML processing appliance and returns $TF_0$ URI to Client. Client again sends SUBSCRIBE to $TF_0$ URI. $QPC_0$ then adds client to its watcher list.

Functionality as Child QPC:

Whenever QPC receives TF request with identity TF, it invokes a 'New Module' and does not contact XML processing appliance. The New Module keeps track of requests of this nature. It creates a TF URI which is returned to $QPC_0$.

On receiving SUBSCRIBE from $QPC_0$ with TF URI, the child QPC adds $QPC_0$ as a watcher. On receiving new presence data from presence server or from other QPC (through NOTIFY), the 'New Module' retrieves presence information for all members of $\hat{MS}_0$ and aggregates them. QPC sends aggregated presence document to $QPC_0$ as it sends to some other client.

Functionality of QPC Factory:

Upon receiving a new request from, QPC factory checks for the existence of a QPC that has the same MS as the new $MS_0$. If there exists such a QPC, then QPC factory redirects the client to this QPC URI.

If such a QPC does not exist, QPC factory runs greedy set cover or adaptive weighted set cover algorithm to determine collection of MSs which can cover members of $MS_0$ (complete or partial match; in case of partial match it also returns $MS_0^{out}$).

QPC factory then creates new $QPC_0$ and passes list of collection of membership sets and corresponding QPCs to $QPC_0$ It redirects the client to URI of $QPC_0$. It then adds $QPC_0$ into the hierarchy.

TABLE 2

Performance Results (comparison of PS Subscriptions for test-bed evaluation).

| No. of Requests | Without QPC Hierarchy | With QPC Hierarchy |
|---|---|---|
| 10 | 67 | 18 |
| 50 | 288 | 34 |
| 100 | 576 | 45 |

TABLE 3

Performance Results (comparison between Greedy Set Cover (GSC) and Adaptive Weighted Set Cover (AWSC)).

| Process | No. of Requests | No. of QPCs Created | Hierarchy Height (Level) | No. of Presentities used | QPC-QPC edges |
|---|---|---|---|---|---|
| GSC | 10 | 8 | 3 | 18 | 15 |
| WSC | 10 | 8 | 4 | 18 | 16 |
| GSC | 50 | 24 | 4 | 34 | 56 |
| WSC | 50 | 24 | 6 | 34 | 73 |
| GSC | 100 | 45 | 4 | 45 | 119 |
| WSC | 100 | 45 | 7 | 45 | 144 |

What is claimed is:

1. A method for creating scalable presence subscriptions in a federated and virtualized presence environment comprising:
   receiving a query from a client device over a network, the query including a membership set which comprises a set of presentities, each presentity comprising an entity defined by presence information and being associated with a unique identifier or indicator;
   decomposing the membership set, comprising said set of presentities, into existing membership sets;
   determining if one or more existing query processing cells, which correspond to the existing membership sets, can be reused to satisfy the query;
   creating a new query processing cell, based on the one or more existing query processing cells, to satisfy the query;
   subscribing the new query processing cell to the one or more existing query processing cells;
   obtaining additional presence information according to the query, via utilizing the new query processing cell, the additional presence information comprising information required to answer the query and not included in the set of presentities;
       said obtaining comprising applying transformation logic on the additional presence information of all presentities in the membership set; and
       returning the presence information as a query response to the client device over the network.

2. The method according to claim 1, wherein determining if one or more existing query processing cells can be reused to satisfy the query further comprises utilizing a hierarchical management strategy to reuse the one or more existing query processing cells.

3. The method according to claim 1, wherein the query comprises the transformation logic.

4. The method according to claim 3, wherein:
   the membership set comprises one or more presentity uniform resource locators; and
   the transformation logic comprises logic over the one or more presentity uniform resource locators necessary for forming the query response.

5. The method according to claim 1, wherein determining if one or more existing query processing cells can be reused to satisfy the query further comprises determining an optimal combination of one or more existing query processing cells to satisfy the query.

6. The method according to claim 5, wherein the new query processing cell subscribes to a combination of the one or more existing query processing cells.

7. The method according to claim 6, further comprising receiving a notification of change in presence information for one or more presentities in a membership set of the query, wherein the notification of change is derived from one or more of: an existing query processing cell, and a presence server;
   wherein the notification of change is transmitted as a query result to the client device.

8. The method according to claim 7, wherein the notification of change is first derived from the presence server and propagated up through one or more query processing cells.

9. The method according to claim 1, further comprising:
   maintaining a hierarchy management table, the hierarchy management table comprising entries for all memberships sets of the one or more existing query processing cells; and
   determining if one or more members of the membership set of the query match one or more members of the one or more existing query processing cells.

10. The method according to claim 9, wherein determining if one or more existing query processing cells can be reused to satisfy the query further comprises determining a combination of existing query processing cells such that a maximum number of members of the membership set of the query match the one or more members of the one or more existing query processing cells.

11. The method according to claim 1, further comprising: determining a node level within a hierarchy of existing query processing cells for the new query processing cell to satisfy the query.

12. The method according to claim 11, wherein:
the new query processing cell is one of type 1, type 2 and type 3;
the new query processing cell is type 1 if the new query processing cell obtains presence information only from one or more presence servers;
the new query processing cell is type 2 if the new query processing cell obtains presence information only from one or more existing query processing cells; and
the new query processing cell is type 3 if the new query processing cell obtains presence information from both one or more existing query processing cells and one or more presence servers.

13. The method according to claim 1, wherein determining if one or more existing query processing cells can be reused to satisfy the query further comprises applying an adaptive weighted set cover approach over all existing membership sets of the one or more existing query processing cells responsive to receiving the query; and
wherein output of the adaptive weighted set cover approach comprises:
a collection of membership sets of the one or more existing query processing cells that contains at least one presentity of the membership set of the query; and
a set of one or more presentities that does not exist in the membership sets of the one or more existing query processing cells.

14. A computer program product comprising a non-transitory computer readable medium for creating scalable presence subscriptions in a federated and virtualized presence environment comprising:
computer readable program code configured to receive a query from a client device over a network, the query including a membership set which comprises a set of presentities, each presentity comprising an entity defined by presence information and being associated with a unique identifier or indicator;
computer readable program code configured to decompose the membership set, comprising the set of presentities, into existing membership sets;
computer readable program code configured to determine if one or more existing query processing cells, which correspond to the existing membership sets, can be reused to satisfy the query;
computer readable program code configured to create a new query processing cell, based on the one or more existing query processing cells, to satisfy the query;
computer readable program code configured to subscribe the new query processing cell to the one or more existing query processing cells;
computer readable program code configured to obtain additional presence information according to the query, via utilizing the new query processing cell, the additional presence information comprising information required to answer the query and not included in the set of presentities;
the obtaining comprising applying transformation logic on the additional presence information of all presentities in the membership set; and
computer readable program code configured to return the presence information as a query response to the client device over the network.

15. The computer program product according to claim 14, wherein determining if one or more existing query processing cells can be reused to satisfy the query further comprises utilizing a hierarchical management strategy to reuse the one or more existing query processing cells.

16. The computer program product according to claim 14, wherein the query comprises the transformation logic.

17. The computer program product according to claim 16, wherein:
the membership set comprises one or more presentity uniform resource locators; and
the transformation logic comprises logic over the one or more presentity uniform resource locators necessary for forming the query response.

18. The computer program product according to claim 14, wherein determining if one or more existing query processing cells can be reused to satisfy the query further comprises utilizing a virtual presence server to determine an optimal combination of one or more existing query processing cells to satisfy the query.

19. The computer program product according to claim 14, wherein determining if one or more existing query processing cells can be reused to satisfy the query further comprises applying an adaptive weighted set cover approach over all existing membership sets of the one or more existing query processing cells responsive to receiving the query; and
wherein output of the adaptive weighted set cover approach comprises:
a collection of membership sets of the one or more existing query processing cells that contains at least one presentity of the membership set of the query; and
a set of one or more presentities that does not exist in the membership sets of the one or more existing query processing cells.

20. An apparatus for creating scalable presence subscriptions in a federated and virtualized presence environment comprising:
one or more processors; and
a memory operatively connected to the one or more processors;
wherein, responsive to execution of computer readable program code accessible to the one or more processors, the one or more processors are configured to:
receive a query from a client device over a network, the query including a membership set which comprises a set of presentities, each presentity comprising an entity defined by presence information and being associated with a unique identifier or indicator;
decompose the membership set, comprising the set of presentities, into existing membership sets;
determine if one or more existing query processing cells, which correspond to the existing membership sets, can be reused to satisfy the query;
create a new query processing cell, based on the one or more existing query processing cells, to satisfy the query;
subscribe the new query processing cell to the one or more existing query processing cells;
obtain additional presence information according to the query, via utilizing the new query processing cell, the additional presence information comprising information required to answer the query and not included in the set of presentities;

the obtaining comprising applying transformation logic on the additional presence information of all presentities in the membership set; and return the presence information as a query response to the client device over the network.

\* \* \* \* \*